United States Patent [19]

Ueno et al.

[11] Patent Number: 5,180,231
[45] Date of Patent: Jan. 19, 1993

[54] MEMBER FOR RETAINING ROLLING BODIES

[75] Inventors: Hiroshi Ueno; Shoji Hatabu; Etsuko Kumata; Takehiro Adachi, all of Osaka, Japan

[73] Assignee: Koyo Seiko Co., Ltd., Osaka, Japan

[21] Appl. No.: 813,862

[22] Filed: Dec. 27, 1991

[30] Foreign Application Priority Data

Dec. 28, 1990 [JP] Japan ............................ 2-409517
Aug. 6, 1991 [JP] Japan ............................ 3-196856

[51] Int. Cl.⁵ .......................................... F16C 33/44
[52] U.S. Cl. .................................. 384/527; 384/909; 384/910

[58] Field of Search ............... 384/527, 576, 909, 910, 384/911, 614, 623

[56] References Cited

U.S. PATENT DOCUMENTS 1,982,347 11/1934 Large ................................ 384/527
4,339,374 7/1982 Olschewski et al. ............... 384/576
4,541,739 9/1985 Allen et al. ........................ 384/527
4,997,295 5/1991 Saiton ............................... 384/527

*Primary Examiner*—Lenard A. Footland
*Attorney, Agent, or Firm*—Mason, Fenwick & Lawrence

[57] ABSTRACT

A rolling body retaining member comprising, based on the whole weight thereof, 15 to 50 wt. % of glass fiber or like reinforcing fiber, 5 to 15 wt. % of carbon powder, and the balance polyether ether ketone resin.

8 Claims, 4 Drawing Sheets

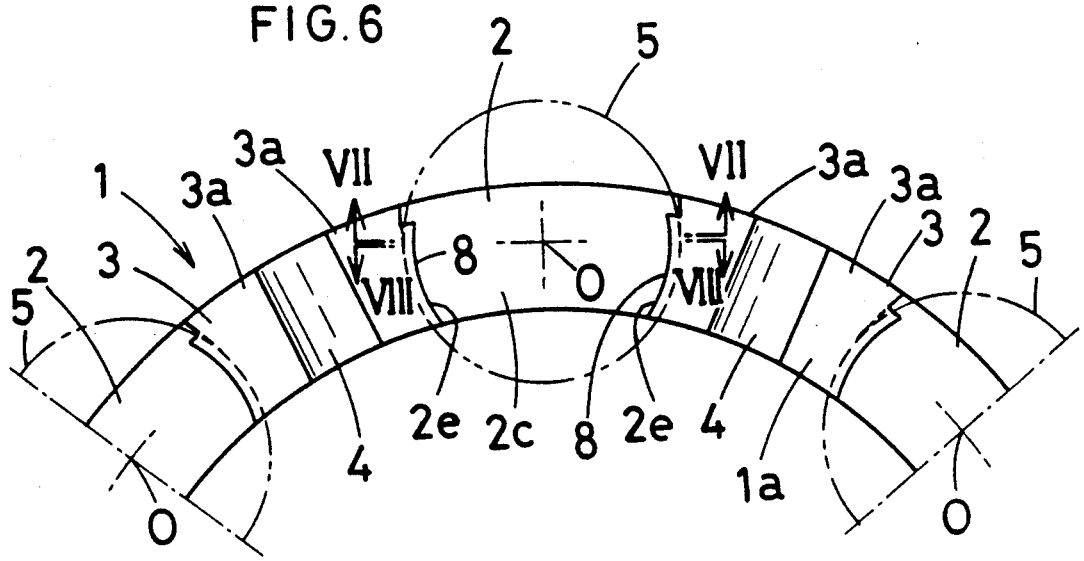
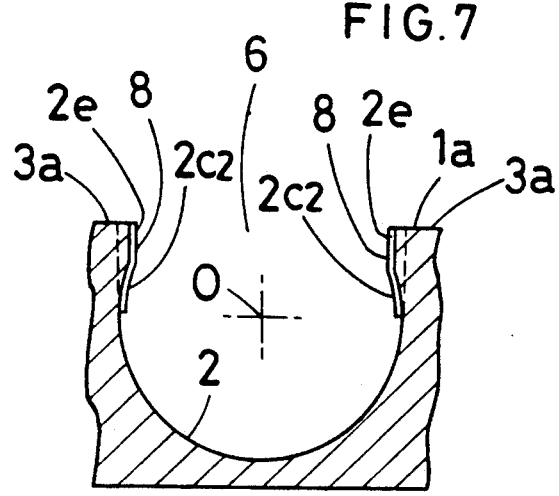
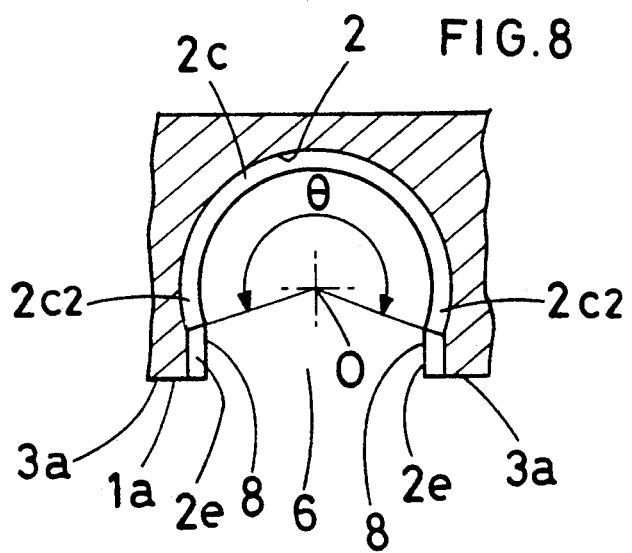

MEMBER FOR RETAINING ROLLING BODIES

BACKGROUND OF THE INVENTION

The present invention relates to rolling body retaining members suitable especially for use at high temperatures at which grease is not usable. The term "rolling body retaining member" as used herein generally refers to members for retaining rolling bodies, such as retainers in antifriction bearings and separators in turntable bearings.

Various retainers formed by a high polymer material having self-lubricity have been proposed for use in antifriction bearings which are used at high temperatures at which grease is not usable.

However, none of the retainers available are usable at a high temperature of at least 300° C. with satisfactory lubricity.

For example, polytetrafluoroethylene resin (PTFE resin) has self-lubricity but is relatively soft and becomes softer at high temperatures, so that the resin is insufficient in rigidity and is not usable. Polyether ether ketone resin (PEEK resin) has no lubricity although excellent in heat resistance.

The same problem as above is experienced also with other types of rolling body retaining members, such as separators of turntable bearings for use in vacuum devices at high temperatures.

SUMMARY OF THE INVENTION

The main object of the present invention is to provide a rolling body retaining member which is free of the foregoing problem and which is usable at high temperatures of at least 300° C. without lubrication.

The rolling body retaining member of the present invention comprises a reinforcing fiber, carbon powder and the balance polyether ether ketone resin.

PEEK resin has a high melting point (334° C.) and is excellent in strength at high temperatures. Moreover, the retaining member contains a reinforcing fiber, such as glass fiber, having a higher melting point than the resin and is therefore given further improved strength at high temperatures. Carbon powder also has a higher melting point than the base material, i.e., PEEK resin, and is transferred to the rolling bodies to form a carbon film and exhibit high lubricity.

Accordingly, the rolling body retaining member of the present invention is usable at a high temperature of at least 300° C. for a long period of time without lubrication.

The retaining member contains the reinforcing fiber preferably in an amount of 15 to 50 wt. %, more preferably about 30 wt. %, based on the whole weight of the member. If the amount is less than 15 wt. %, the retaining member is given no reinforcing effect, exhibits variations in mechanical strength relative to the amount of fiber and is not amenable to quantity production. If the amount is over 50 wt. %, the fiber is difficult to incorporate into PEEK resin. To avoid damage to the counterpart material when the content of reinforcing fiber is great, it is desirable to use a reinforcing fiber having a reduced diameter, for example, of about 6 micrometers.

The content of carbon powder is preferably 5 to 15 wt. %, more preferably about 10 wt. %, based on the whole weight. If the carbon content is less than 5 wt. %, no lubricating effect is available, whereas if it is greater than 15 wt. %, carbon powder is difficult to incorporate into PEEK resin.

BRIEF DESCRIPTION OF THE DRAWINGS

FIG. 6 is a view of the retainer as it is seen in the direction of arrows VI—VI in FIG. 5;

FIG. 7 is a view in section taken along the line VII—VII in FIG. 6;

FIG. 8 is a view in section taken along the line VIII—VIII in FIG. 6;

DESCRIPTION OF THE PREFERRED EMBODIMENTS

Figure 1:
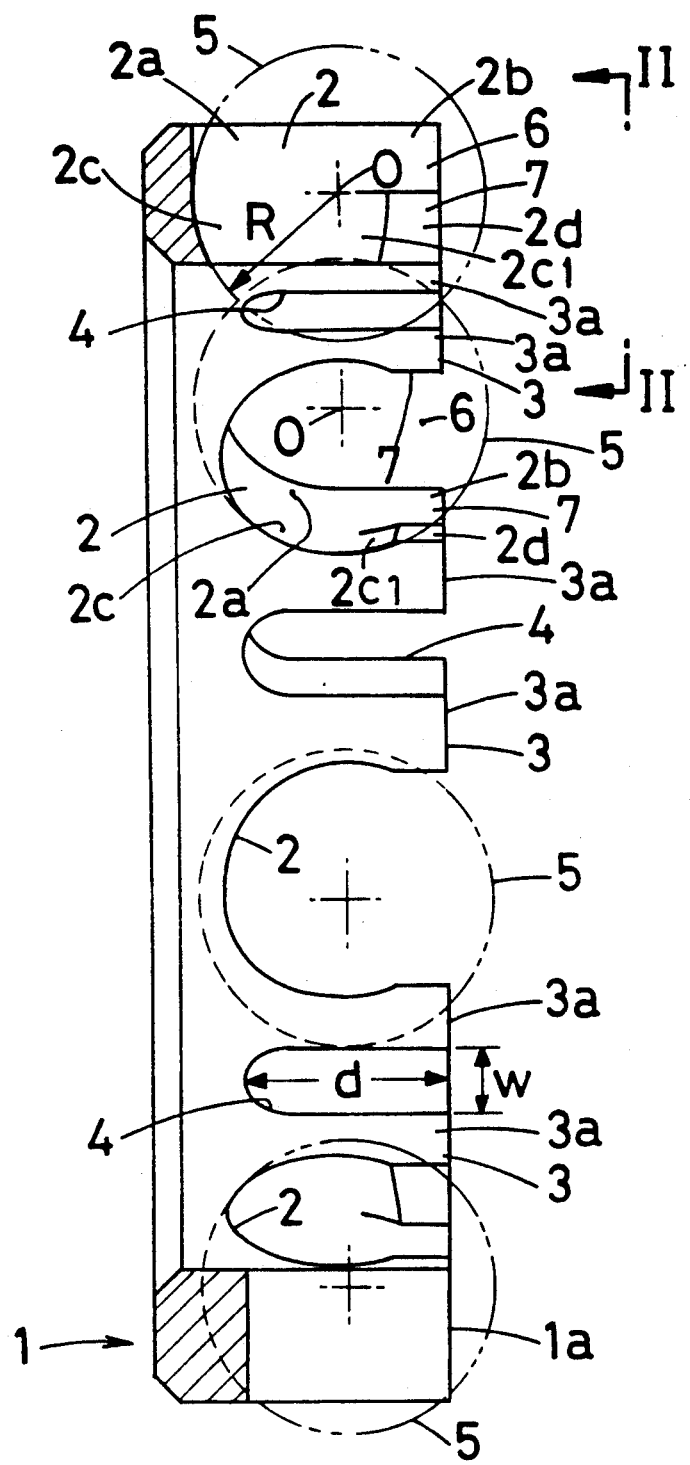
FIG. 1 is a view in vertical section showing a crown-shaped retainer as a first embodiment of the invention.
Figure 2:
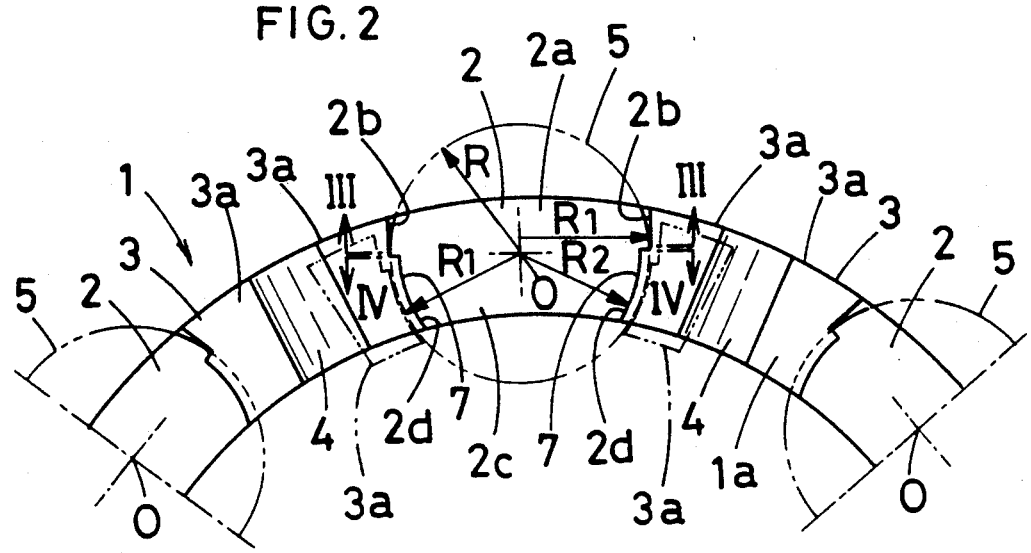
FIG. 2 is a view of the retainer as it is seen in the direction of arrows II—II in FIG. 1.
Figure 3:
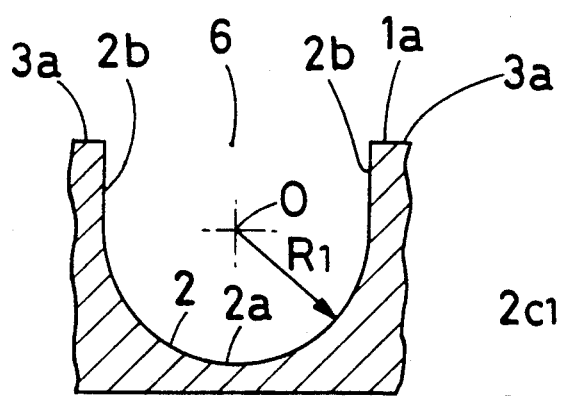
FIG. 3 is a view in section taken along the line III—III in FIG. 2.

Embodiments of the present invention will be described below.

Table 1 shows Comparative Examples 1 and 2, and Example, i.e., three kinds of retainers for use in deep groove ball bearings. These retainers were prepared and checked for properties. Table 2 shows the measurements obtained.

TABLE 1

|  | Base material | Reinforcement | Lubricant |
| --- | --- | --- | --- |
| Comp. Ex. 1 | PEEK resin | Glass fiber 30 wt. % | None |
| Comp. Ex. 2 | PEEK resin | Glass fiber 30 wt. % | PTFE resin 10 wt. % |
| Example | PEEK resin | Glass fiber 30 wt. % | Carbon powder 10 wt. % |

TABLE 2

|  | Comp. Ex. 1 | Comp. Ex. 2 | Example |
| --- | --- | --- | --- |
| Specific gravity | 1.49 | 1.58 | 1.54 |
| Tensile strength kgf/cm$^2$ | 1450 | 1600 | 1450 |
| Bending strength kgf/cm$^2$ | 2250 | 2400 | 2400 |
| Izod impact strength kgf · cm/cm | 9 | 10 | 8 |
| Thermal deformation temperature 18.5 kgf/cm$^2$ | 315 | >300 | >300 |
| Rockwell hardness | R124 | R105 | R116 |

With reference to Table 1, the glass fiber serving as the reinforcing material (reinforcement) is 6 micrometers in diameter.

Each of Comparative Examples and Examples includes a plurality of retainers which are different in size.

While the retainers of Examples are prepared by injection molding, PEEK resin, carbon powder and glass fiber are kneaded together by a twin-screw extruder prior to injection molding. Three feeders (inlets)

are provided in front of the extruder. More specifically, feeders for PEEK resin, carbon powder and glass fiber are arranged in this order from the front toward the extruder. Since glass fiber is fragile, the feeder therefor is in the rearmost position. An air vent is provided between the feeders. The materials contain water and release volatile gas upon reaction, and the gas is likely to embrittle the molding when incorporated therein. To preclude this, the air vent is provided for the removal of gas. Further when the kneading temperature is in excess of 430° C., the material per se is liable to thermally deteriorate (oxidize), so that speed, etc. are suitably controlled not to permit the temperature to exceed this level. For example, the materials, if kneaded intensely, autogenously evolve heat to become heated to a higher temperature, so that the process is controlled to maintain the temperature to not higher than 430° C.

The retainers of Comparative Examples are prepared also substantially in the same manner as those of Examples.

FIGS. 1 to 4 show the configuration of an example of retainer according to the invention. The retainer is a crown-shaped retainer disclosed, for example, in Unexamined Japanese Utility Model Publication HEI 2-132125 (U.S. Pat. No. 5,015,105).

The illustrated crown-shaped retainer 1 is generally in the form of a hollow cylinder and has a plurality of pockets 2 arranged circumferentially thereof at equal spacings, extending through the cylinder radially thereof and each left open at an axial one end 1a. Each of wall portions 3 between the pockets 2 is formed, approximately in the circumferential midportion thereof, with an axial recess 4 opened at one end 1a and radially extending through the wall portion 3. The recess 4 has an axial depth d approximately equal to the depth of the pocket 2 from the end 1a and a predetermined width w in the circumferential direction. The wall portion 3 is divided by the recess 4 into two approximately equal portions arranged in the circumferential direction, providing two cantilevered branches 3a resembling a tuning fork.

The retainer 1 is disposed between illustrated inner and outer rings, and balls 5 rollable between the raceways of the respective inner and outer rings are accommodated in the respective pockets 2. The recesses 4 in the wall portions 3 serve as relief spaces for the elastic deflection of the branches 3a when the balls 5 are to be inserted into the pockets 2 as will be described in detail later.

Figure 4:
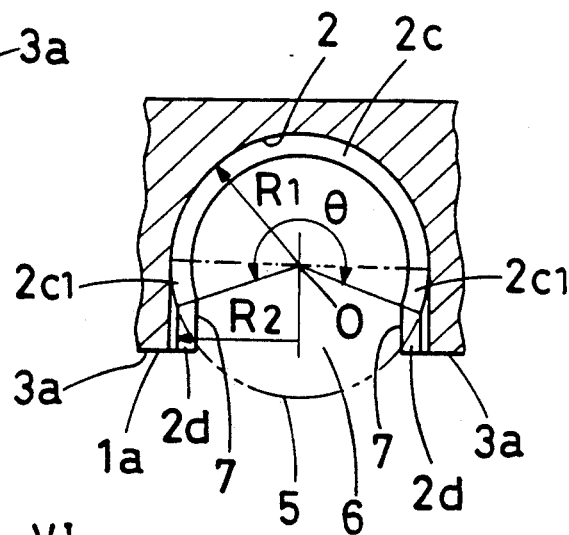
FIG. 4 is a view in section taken along the line IV—IV in FIG. 2.
Figure 5:
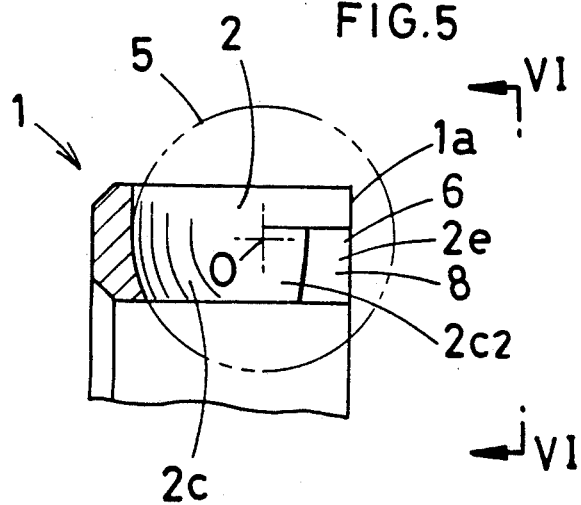
FIG. 5 is a view in vertical section showing another crown-shaped retainer embodying the invention.

The radially outer side of each pocket 2 is formed by a radial semicylindrical surface 2a centered about the center O of the pocket 2 and having a radius R1, and planar surfaces 2b parallel to the axis, separated by a distance 2R1 and extending from the surface 2a. These surfaces 2a, 2b form a U-shaped surface which is open toward the end 1a. The radially inner side of the pocket 2 is formed by a spherical surface 2c centered about the center O of the pocket 2 and having a radius R1, and an axial cylindrical surface 2d having an axis extending through the center O of the pocket 2 and having a radius R2. The radius R1 of the spherical surface 2c is slightly larger than the radius R of the ball 5. Further the radius R2 of the cylindrical surface 2d is smaller than the radius R of the ball 5 by a predetermined dimension. Since the radius R2 of the cylindrical surface 2d forming the radially inner side of the inlet 6 of the pocket 2 is smaller than the radius R1 of the spherical surface 2c, an angle $\theta$ which is shown in FIG. 4 and over which the spherical surface 2c extends is larger than 180 degrees. Accordingly, the retainer 1 is held axially engaged, over the spherical surface 2c, with each ball 5 accommodated in the pocket 2. In other words, the retainer 1 is axially held engaged and axially supported by each ball 5. The portions 2cl included in the surface 2c and subtending the respective angle portions in excess of 180 degrees are axially in engagement with the ball 5, whereby the ball 5 is prevented from axially slipping off from the inlet 6. Simultaneously with the axial engagement, each spherical surface 2c of the retainer 1 is radially in engagement with the ball 5, which in turn radially supports the retainer 1. Thus, the retainer is positioned between and held spaced apart from the inner and outer rings as specified.

The cylindrical surface portions 2d of the branches 3a on opposite sides of the pocket 2 and positioned between the end 1a and the portions 2cl included in the spherical surface 2c and subtending the angle portions in excess of 180 degrees serve as clawlike engaging portions 7 constricting the inlet 6 of the pocket 2. These engaging portions 7 hold each ball 5 in the axial and radial directions as described above.

When the ball 5 is to be inserted into each pocket 2 of the retainer 1, the pair of branches 3a positioned at circumferentially opposite sides of the inlet 6 of the pocket 2 are pressed on by the ball 5, whereby the engaging portions 7 are elastically pushed away from each other to a position permitting passage of the ball 5 between these portions 7. Since the recess 4 is formed in the wall portion 3, the entire wall portion 3 between the pockets 3 does not deflect, but the wall portion 3 deflects locally at the branches 3a. The depth d and the width w of the recess 4 are suitably determined in view of the flexibility of PEEK resin so as to give the branches 3a suitable deflective spring properties as required for the insertion of the ball 5. Consequently, the recesses 4 serve as relief spaces for the deflection of branches 3a, and the cantilevered branches 3a each having the engaging portion 7 radially inward undergo deformation which involves deflection in both circumferential and radial directions. Thus, the branches 3a are greatly spreadable as illustrated in phantom lines in FIG. 2. Although the retainer 1 is made of PEEK resin which is so low in flexibility that the balls are not insertable into the pockets if the retainer 1 is of the conventional crownshaped construction, the branches 3a and the engaging portions 7 are elastically deformable with ease smoothly to a position permitting the balls 5 to pass therebetween. As a result, the balls are elastically inserted into the pockets 2 with ease. With the balls 5 completely accommodated in the pockets 2, the balls 5 are axially held in place by the engaging portions 7 of branches 3a of the wall portions 3 which are elastically restored, consequently preventing the retainer 1 from slipping off reliably. The retainer 1 holds the balls 5 smoothly rotatably inserted in the respective pockets 2 and arranged at a predetermined spacing in the circumferential direction.

The branches 3a at opposite sides of each pocket 2 are easily movable away from each other through the combination of circumferential and radial movements. The retainer 1 can therefore be integrally formed by a mold from which the molding is removable by axially successively removing cores corresponding to the recesses 4 and the pockets 2. Alternatively, the retainer is moldable in such manner that the cores corresponding to the recesses 4 are axially removed, with the cores corresponding to the pockets 2 radially withdrawn.

The retainers of Comparative Examples 1 and 2 were prepared in the same configuration as those of Example.

The retainers of specified size prepared in Comparative Examples 1 and 2 and Example were used to fabricate deep groove ball bearings with a bearing number of 626 (6 mm in inside diameter, 19 mm in outside diameter and 6 mm in width). The inner and outer rings and balls of these bearings were all made of SUS 440C. All the bearings were subjected to an endurance test under the following conditions. The inner rings of two bearings including the same retainers were fixed to a rotary shaft, with the outer rings of the bearings fixed to a housing serving also as a weight, and the rotary shaft was rotated at a speed of 500 r.p.m. while applying a radial load of 2.3 kgf to each bearing. A band heater was attached to the outer periphery of the housing, and the outer surface temperature of the outer ring of one of the bearings was measured to maintain the temperature at 300° C.

The test results were as follows.

With respect to the two bearings having the retainers of Comparative Example 1, the retainers were broken in about 150 hours or 170 hours. With respect to the two bearings incorporating the retainers of Comparative Example 2, the retainers were broken in about 250 hours or 270 hours. With respect to the two bearings including the retainers of Example, the retainers remained free of breakage even after the lapse of 300 hours.

Next, deep groove ball bearings with a bearing number of 6204 (20 mm in inside diameter, 47 mm in outside diameter and 14 mm in width) were prepared using retainers of specified size obtained in Example. The inner and outer rings and balls of these bearings were all made of SUS 440C. Using the same device as above, the bearings were tested for endurance at a temperature of 350° C. by rotating the inner rings at 500 r.p.m. for 700 hours and applying a radial load of 2.8 kgf to each bearing.

The temperature of 350° C. employed for the endurance test is higher than the melting point of PEEK resin, the base material of the retainers, whereas none of the retainers completely melted even in 700 hours. This indicates that the retainers of Example have considerably high heat resistance at temperatures close to the melting point. Although the raceways of the inner and outer rings became somewhat rough-surfaced, the balls were neatly covered with carbon serving as a lubricant and transferred thereto and appeared glossy and black.

These test results indicate that the bearing including the retainer of Example are usable at a high temperature of at least 300° C.

The crown-shaped retainer 1 shown in FIGS. 1 to 4 has the recess 4 in each wall portion 3, so that the spring properties of the branches 3a are adjustable by suitably determining the shape and dimensions (depth d and width w) of the recess 4 in accordance with the flexiblity of the material, while the deflection of the branches 3a for the insertion of the ball 5 can be accommodated by the recess 4. Additionally, the branches 3a of the wall portion 3 defining each pocket 2 are formed, on the radially inner side, with engaging portions 7 for axially and radially engaging the ball 5, so that when the ball 5 is to be axially inserted into the pocket 2, the branches 3a at opposite sides of the pocket 2 can be elastically deflected away from each other through the combination of circumferential and radial movements. Accordingly, even if the retainer 1 is formed of PEEK resin which is low in flexibility, the engaging portions 7 can be forced away from each other easily to a position permitting the passage of the ball 5. Thus, the ball 5 can be inserted into the pocket 2 easily and reliably. Use of the retainer 1 realizes a ball bearing which is rotatable at a high speed and resistant to high temperatures.

The retainer can be so shaped as shown in FIGS. 5 to 8. FIGS. 5 to 8 correspond to FIGS. 1 to 4, respectively. In this case, engaging portions 8 of the pocket 2 are formed by spherical surface portions 2c2 provided by radially outwardly extending the portions 2c1 included in the pocket-forming spherical surface 2c of the foregoing embodment and subtending the angle portions in excess of 180 degrees, and a cylindrical portion 2e formed by radially outwardly extending the cylindrical surface 2d. The retainer 1 is held radially engaged with each ball 5 by the engaging portions 8. With the exception of this feature, the present embodiment has the same advantage as the foregoing embodiment. The engaging portions are not limited to those composed of a spherical surface and a cylindrical surface as described above insofar as they are capable of axially and radially engaging the ball.

Further the configuration of the retainer is not limited to those of the two embodiments but can be altered suitably.

Figure 9:
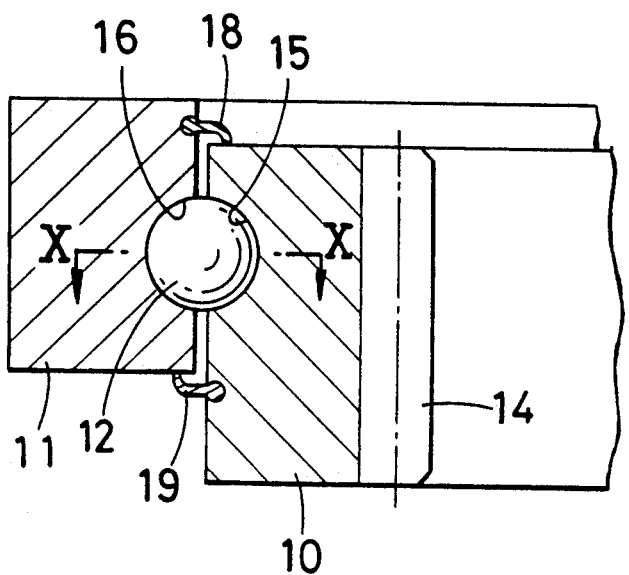
FIG. 9 is a fragmentary view in vertical section showing a turntable bearing as another embodiment of the invention.
Figure 10:
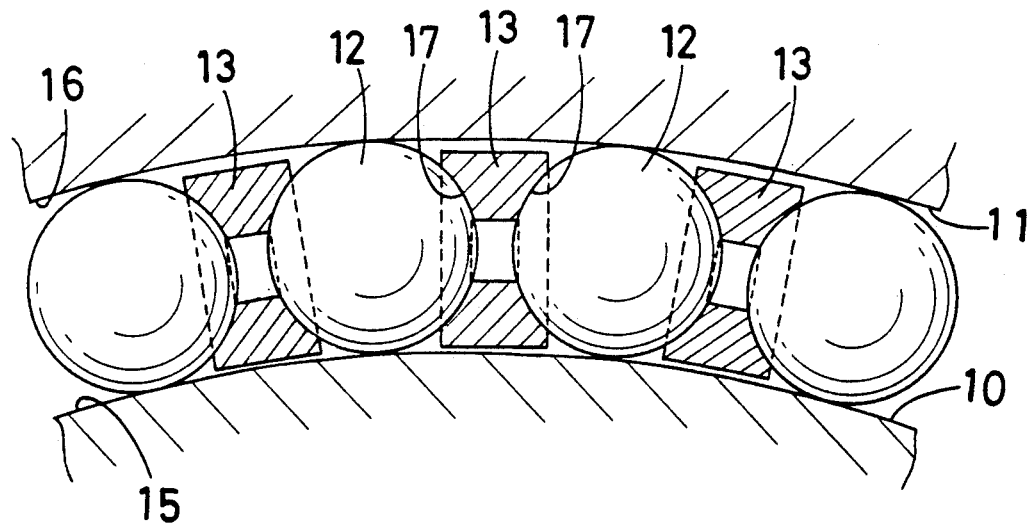
FIG. 10 is an enlarged view in section taken along the line X—X in FIG. 9.

FIGS. 9 and 10 show an embodiment wherein the invention is applied to a turntable bearing for use in vacuum devices.

The bearing comprises an inner ring 10, an outer ring 11, a plurality of balls 12 provided between the inner and outer rings 10, 11, and a plurality of separators 13 interposed between the balls 12. The inner ring 11 is formed with inner teeth 14 on its inner periphery. Raceways 15, 16, which are approximately semicircular in cross section, are formed in the outer periphery of the inner ring 10 and the inner periphery of the outer ring 11, respectively. The balls 12 are fitted in these raceways 15, 16. The separator 13 is in the form of a bored short cylinder, each end race of which is formed with a shallow spherical cavity 17 for the ball 12 to partly fit in. The balls 12 are held arranged at a predetermined spacing by separators 13. Seals 18, 19 are provided between the inner and outer rings 10, 11 at opposite ends thereof.

The inner and outer rings 10, 11 and the balls 12 are made of a material having high corrosion resistance, e.g., SUS 440C. Like Example listed in Table 1, the separators 13 are prepared from 30 wt. % of glass fiber, 6 micrometers in diameter, 10 wt. % of carbon powder and the balance PEEK resin.

According to the foregoing embodiments, the inner and outer rings of antifriction bearings and the balls thereof are made of SUS 440C in view of heat resistance and corrosion resistance. Alternatively, these components may be made of a ceramic material consisting primarily of silicon nitride, or the balls only may be made of such a ceramic material. Rollers may be used in place of the balls.

What is claimed is:

1. A rolling body retaining member comprising a reinforcing fiber, carbon powder and the balance polyether ether ketone resin.

2. A rolling body retaining member as defined in claim 1 which contains 15 to 50 wt. % of the reinforcing fiber based on the whole weight of the member.

3. A rolling body retaining member as defined in claim 2 wherein the reinforcing fiber is about 6 micrometers in diameter.

4. A rolling body retaining member as defined in claim 1 which contains about 30 wt. % of the reinforcing fiber based on the whole weight of the member.

5. A rolling body retaining member as defined in claim 3 wherein the reinforcing fiber is about 6 micrometers in diameter.

6. A rolling body retaining member as defined in claim 1 which contains about 10 wt. % of the carbon powder based on the whole weight of the member.

7. A rolling body retaining member as defined in claim 1 wherein the reinforcing fiber is about 6 micrometers in diameter.

8. A rolling body retaining member as defined in claim 1 which contains 5 to 15 wt. % of the carbon powder based on the whole weight of the member.

* * * * *